US008374008B2

(12) United States Patent
Rinne et al.

(10) Patent No.: US 8,374,008 B2
(45) Date of Patent: Feb. 12, 2013

(54) POWER CONVERTER

(75) Inventors: Karl Rinne, Youghal (IE); Antoin Russell, Castleconnell (IE)

(73) Assignee: Powervation Limited, Limerick (IE)

( * ) Notice: Subject to any disclaimer, the term of this patent is extended or adjusted under 35 U.S.C. 154(b) by 446 days.

(21) Appl. No.: 12/687,117

(22) Filed: Jan. 13, 2010

(65) Prior Publication Data

US 2010/0164454 A1    Jul. 1, 2010

Related U.S. Application Data

(63) Continuation-in-part of application No. PCT/EP2008/059127, filed on Jul. 11, 2008.

(30) Foreign Application Priority Data

Jul. 13, 2007 (IE) .................................... 2007/0509

(51) Int. Cl.
*H02M 7/00* (2006.01)

(52) U.S. Cl. ........................................ 363/65; 323/287

(58) Field of Classification Search .............. 363/16–17, 363/21.01, 21.04, 21.07, 34, 37, 65, 71, 98; 323/222, 268, 271–275, 282–287, 907, 903, 323/351; 307/31–35, 43, 53, 58, 59, 150, 307/155, 82; 361/62
See application file for complete search history.

(56) References Cited

U.S. PATENT DOCUMENTS

| | | | | |
|---|---|---|---|---|
| 4,194,147 A | * | 3/1980 | Payne et al. ............... | 323/284 |
| 5,521,899 A | * | 5/1996 | Taki ........................... | 720/662 |
| 5,905,645 A | * | 5/1999 | Cross ......................... | 363/65 |
| 6,023,154 A | * | 2/2000 | Martinez .................... | 323/272 |
| 6,285,571 B1 | * | 9/2001 | Brooks et al. .............. | 363/65 |
| 6,343,026 B1 | * | 1/2002 | Perry ......................... | 363/65 |
| 6,449,174 B1 | * | 9/2002 | Elbanhawy ................. | 363/65 |
| 2002/0044458 A1 | | 4/2002 | Elbanhawy | |

FOREIGN PATENT DOCUMENTS

WO    WO 2007/066676 A1    6/2007

OTHER PUBLICATIONS

The International Bureau of WIPO, "International Preliminary Report on Patentability and Written Opinion of the International Searching Authority", international application No. PCT/EP2008/059127, dated Jan. 28, 2010, 9 pages.

Claims, international application No. PCT/EP2008/059127, 3 pages.

* cited by examiner

*Primary Examiner* — Rajnikant Patel

(74) *Attorney, Agent, or Firm* — Hickman Palermo Truong Becker Bingham Wong LLP; Edward A. Becker

(57) ABSTRACT

The present invention relates to power converters of the type known generally as switch mode power converters (SMPCs). In particular, the present invention addresses the problem of reducing thermal stress across the phases of a multi phase converter. Specifically, a method of controlling a multi-phase switch mode power arrangement is provided. The multi-phase arrangement comprises a plurality of phases configured to deliver DC power to a common load. The method comprises the steps of: determining the thermal stress of each phase along with at least one other stress for each phase and controlling the share of DC power provided by the individual phases in an effort to equalize the thermal and other stress across the individual phases.

14 Claims, 2 Drawing Sheets

POWER CONVERTER

CROSS REFERENCE TO RELATED APPLICATIONS

Priority Claim

The present application claims benefit to and is a continuation-in-part application of PCT Application No. PCT/EP2008/059127 having a filing date of 11 Jul. 2008, which in turn claims priority from Irish Patent Application No. 2007/0509 filed 13 Jul. 2007, the entire contents of each application are hereby incorporated by reference as if fully set forth herein.

FIELD OF INVENTION

The present application relates to power converters, particularly switch mode power converters (SMPCs).

BACKGROUND

In order to function, electronic components, circuits and systems require electrical power. This power is taken from a power source (AC mains, battery, solar panel), conditioned by a power converter, and delivered to a load. Power converters can be implemented in either a linear fashion, or in switch-mode technology. Switch-mode power converters (SMPCs) are becoming increasingly popular because of their inherently high power conversion efficiency. SMPCs are most fundamental components in electronic systems, and commonly determine their ergonomics as well as overall usefulness. The present application is directed to SMPC's which convert a DC voltage to a DC voltage and are referred to generically as DC-DC converters.

In many applications, such as processors and other complex digital circuits, DC-DC converters need to supply large currents. For a number of reasons (e.g. availability of power handling components, component dimensions, reliability and transient performance) it is common practice to provide the power to the circuit from a plurality of switch mode circuits having their outputs connected in parallel to provide power to a common load. Each switching circuit is said to supply a phase. The phases may be provided with a common controller or individual controllers or indeed a combination of the two. In any event, it will be appreciated that the output phases are in parallel such that the phases feed a common load, and each of the phases contributes to the overall output current supplied to the load circuitry. The most typical implementation is that of a multi-phase buck converter, although other arrangements and topologies are also known. Each of the phases typically consists of active switches and an inductor.

It is important that the individual phases share the work of supplying current to the load so as average out component stresses, and thereby maximize system reliability.

Thus in a typical arrangement, one of the design goals is that each of the SMPC phases contributes a defined ratio of the total output current. Most typically, SMPC designers attempt to have the SMPC phases to contribute the same amount of output current ("current sharing"). A number of techniques are available in order to achieve a degree of current sharing, including both passive current sharing, and active current sharing. Passive current sharing relies on matching of drive signals and power handling components, and achieves current share imbalances of around 10%. Active current share schemes actively measure phase currents, and actively adapt the drive signals such that current share imbalances are minimized. Imbalances of 3% or less are achievable. It is also known to include safety features to switch off individual phases where operating conditions exceed their safe window of operation, for example in the event of overheating or component failure.

The present application seeks to improve upon the reliability of these arrangements.

SUMMARY OF THE INVENTION

Although the prior art methods seek to maximize reliability by trying to ensure that each phase provides its share of the load current, in reality the thermal stress of each phase is determined by more factors than just the output current provided by the phase. Due to electrical and mechanical system limitations and mismatches, each phase in a real system experiences different thermal paths and thermal impedances. As a consequence, the thermal stress arising in each phase may be very different notwithstanding that the phases may share the output current equally. As an example, in a system with fan-assisted forced air convection, the phase experiencing the highest air velocity and most air turbulence may be significantly cooler than the phase located furthest away from the fan. In a real system, the differences in thermal hotspot temperatures may reach values of 20° C., and sometimes more.

The random failure rate of an electronic system is governed by the Arrhenius' relationship. Assuming typical activation energy coefficients, Arrhenius' relationship means that the failure rate of an electronic device or system doubles with about every 10° C. increase in its hotspot temperature. Using above numerical example, in a multi-phase SMPC, the hottest phase operating at a temperature of 20° C. above the hotspot temperature of the coolest phase will have an expected failure rate four times higher than that of the coolest phase notwithstanding that each phase may be providing equal current to the load. Accordingly, system failure rates will be higher than expected. This may be improved upon by attempting to equalize the temperature of each phase rather than the current share. However, as will be discussed below relying solely upon temperature sensing may also cause problems.

Accordingly, the present application addresses this problem by seeking to adjust the load sharing nature of individual phases with reference to their thermal stresses and at least one other stress.

Accordingly, in a first embodiment there is provided a switch mode power converter for conditioning and delivering power to a load in a plurality of phases, and a controller, wherein the controller modifies phase outputs according to thermal and at least one other stress of the phases.

In one embodiment, the controller dynamically modifies the phase outputs according to sensed temperature and at least one other stress such as current or voltage.

The power converter may have temperature sensors linked with the controller. Suitably, these sensors are located at hot spots. Suitably, the controller performs closed-loop control of the phase duty cycles.

The controller may dynamically elect one thermal stress signal as a master stress signal, and the converter comprises a modulator to modify duty cycles of the phases by amounts determined by differences between thermal stress of a phase the master thermal stress. The modulator may comprise an integrating error amplifier. These and other embodiments will become apparent from the detailed description and claims which follow.

BRIEF DESCRIPTION OF THE DRAWINGS

The application will be more clearly understood from the following description of an embodiment thereof, given by way of example only with reference to the accompanying drawings in which:—

DETAILED DESCRIPTION

The application will be explained with reference to a switch mode power arrangement for delivering DC power to a load which includes a stress share scheme which distributes thermal stress of individual phases across common phases. It will be appreciated that each of these phases may be controlled by individual controllers or a single controller may control multiple phases or any combination of these. Similarly, there may be one master controller and several slave controllers or a variety of different control configurations.

A temperature (thermal stress) measurement is carried out at a suitable location in each phase (typically close to the thermal hotspot). In this respect, the hotspot in a phase is generally a switching transistor(s). The temperature may be measured directly, for example by means of a sensor such as a thermistor or similar device. Alternatively, a device parameter in the phase circuit may be monitored to provide an indirect measurement of the thermal stress, e.g. by detecting changes in on-resistance or gate voltages in a switching transistor.

In one exemplary arrangement, the temperature is reported back to a central SMPC controller. The SMPC controller modifies the phase drive signals in a suitable fashion in order to distribute the thermal stress between phases in a defined manner. Each phase then provides a portion of the output current such that the induced thermal stress is an equal proportionate stress relative to the phase's maximum thermal capability so that in a typical application, the thermal stress between phases may be equalized. Compared to conventional multi-phase SMPC employing passive or active current sharing, this arrangement substantially increases the overall reliability of the SMPC by reducing the peak temperature stress.

Figure 1:
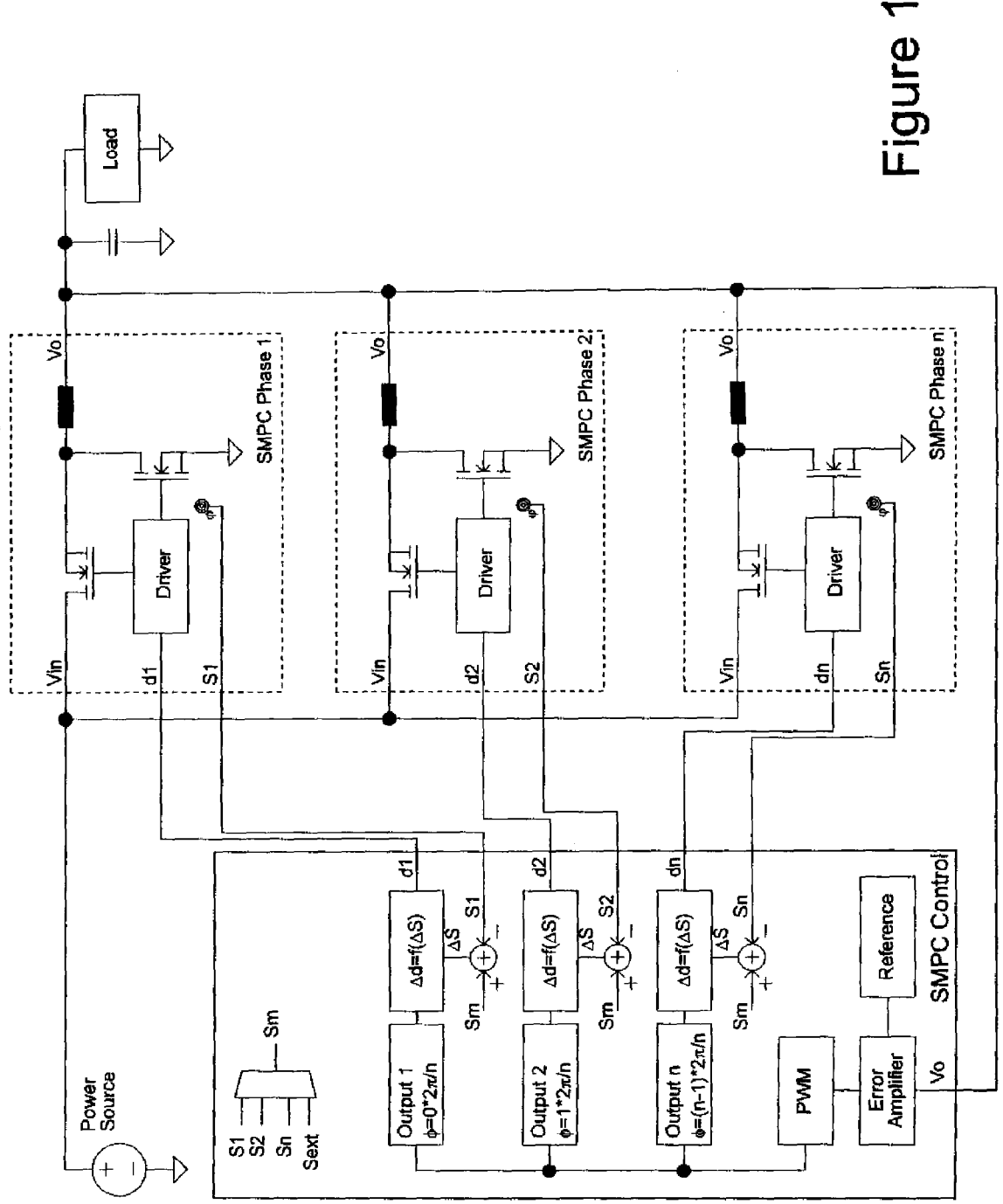
FIG. 1 is a block diagram of an exemplary multi-phase SMPC employing thermal stress to share power between the phases.

Referring to FIG. 1, the output of a multi-phase DC-DC SMPC supplies a DC voltage to a load. Here, the multi-phase SMPC is a synchronous buck converter utilizing n phases. The n-phase buck converter itself is fed by a power source (which may be a battery, ac-dc converter, or similar). The n-phase buck converter is controlled by a SMPC controller. Each phase of the SMPC consists of a pair of switches and an inductor. Phase currents are filtered by one or more common output capacitors. The output voltage $V_O$ is well regulated and predominantly DC, with a small high frequency ripple corresponding to the switching frequency.

Regulation of the output voltage is achieved through closed-loop control by the SMPC controller by means of controlling the required duty cycle d. The SMPC controller senses the output voltage $V_O$, compares it to a reference value, amplifies and compensates the error signal, and modifies the duty cycle d. Duty cycle d is fed to the driver of each phase. Those skilled in the art will be aware of the benefits of phase-shifting the drive signals by a certain phase angle. Thus in a phase shifted converter, the first phase output d1 will be driven without phase shifting ($\phi=0$) with all subsequent phase outputs dk (d2-dn) be driven with a phase delay of $\phi=k*2\pi/n$ relative to the preceding phase output.

The thermal stress of each of the phases is sensed, and reported back to the SMPC controller (signals S1-Sn). Various methods for temperature measurement may be used. The temperature of the phase is taken at or near the phase's hotspot temperature.

In one arrangement, the SMPC controller dynamically elects one of the thermal stress signals through a multiplexer to become the master thermal stress signal Sm. In an alternative embodiment, the SMPC controller averages all thermal stress signals S1-Sn, and produces an averages Sm.

The stress master signal Sm is distributed to the phase control module. The relationship between a change in duty cycle and a change in output current per phase is either known, or may be approximated. In turn, the relationship between output current per phase and thermal stress per phase can be determined. It will be appreciated that both relationships but particularly the latter, may be highly non-linear. Nevertheless, a relationship between a change in duty cycle per phase and a change in thermal stress of this phase can be determined or estimated.

In the exemplary circuit shown, each output of the SMPC controller has an independent modulator modifying the duty cycle $\Delta d$ by an amount determined by the difference of the thermal stress of the module to the stress master signal. Using suitable techniques (such as an integrating error amplifier) the difference between module thermal stress and master thermal stress may be minimized.

Thus, as will be clear from the exemplary embodiment, this leads to a superior stress share scheme, through reduced peak temperatures leading to improved SMPC system reliability through reduced random temperature-induced failure rates.

It may be necessary to limit $\Delta d$ that each stress error amplifier may cause in order to improve system behaviour during abnormal situations. In the event of a fault situation, the stress signals Sk of the known faulty phase may be excluded from becoming the master signal. In complex systems employing multiple SMPC controllers, stress signals may be distributed to some or all SMPC controllers using suitable analogue or digital buses.

Although, the arrangement of FIG. 1 has been described with reference to a control schema in which the phase outputs are controlled with respect to thermal stress, it will be appreciated that other stresses, for example voltage stress, may be experienced by the individual phases. Accordingly, whilst the above application has been described with reference to control based on thermal stresses, it will be appreciated that this schema may readily be modified to account for the measurement and control of additional stresses. In such a modified control schema, the different stresses experienced by a phase may be applied as control inputs in addition to the thermal stress in a weighted fashion so that the control system seeks to equalise each of the measured stresses across the phases. It will be appreciated that in such a scenario, whilst the control algorithm will be attempting to equalise the thermals stresses across the loads, that attempts to equalise other stresses may mean that the thermal stresses are not equalised across the loads despite the efforts of the controller. However, this may improve the operation and overall reliability of the phases in a variety of situations for example where the temperature sensors employed are not accurate or where the temperature sensors are not ideally placed with respect to one or more of the switching elements of the phase. The modified weighted schema may also be advantageous in situations where there is a transient condition, for example a load is applied. In such a situation, the time response of the temperature sensor may be relatively slow compared to the rate of change in current. Employing current in addition to temperature as a stress signal may be advantageous in such situations as it may act earlier to prevent overheating In such a modified schema, a plurality of stress values may be measured for example in addition to thermal stress one or other or both of current and voltage stress may be measured. In the multiphase arrangement, each phase may attempt to equalise each stress value, i.e. where a stress value for a phase is out of line with the average stress value of the phases, a control input may be applied to equalise the stress.

The control schema may operate to adjust the duty cycle of a phase by an amount $\Delta d$ in accordance with a weighted function as set forth in equation 1 which follows:

$$\Delta d = \alpha_2(T_M - T_{Phase}) + \alpha_2(I_M - I_{Phase}) + \alpha_3(V_M - V_{Phase}) \qquad \text{Equation 1}$$

where $T_M$ represents the Master Temperature stress signal, $I_M$ represents the Master Current stress signal and $V_M$ the Master Voltage stress signal and $T_{Phase}$, $I_{Phase}$, $V_{Phase}$ the corresponding stress signals as measured in the individual phase. The values of $\alpha_1$, $\alpha_2$, $\alpha_3$ are suitably selected weighting values. As before the value of $\Delta d$ may be employed in an effort to minimize the phase stresses with respect to the overall stress. Equation 1 illustrates proportional control for clarity, but more sophisticated control schemes such as PID may be applied according to similar principles.

It may be necessary to limit $\Delta d$ that each stress error amplifier may cause in order to improve system behaviour during abnormal situations. In the event of a fault situation, the stress signals of an identified faulty phase may be excluded from becoming the master signal. In complex systems employing multiple SMPC controllers, stress signals may be distributed to some or all SMPC controllers using suitable analogue or digital buses.

Figure 2:
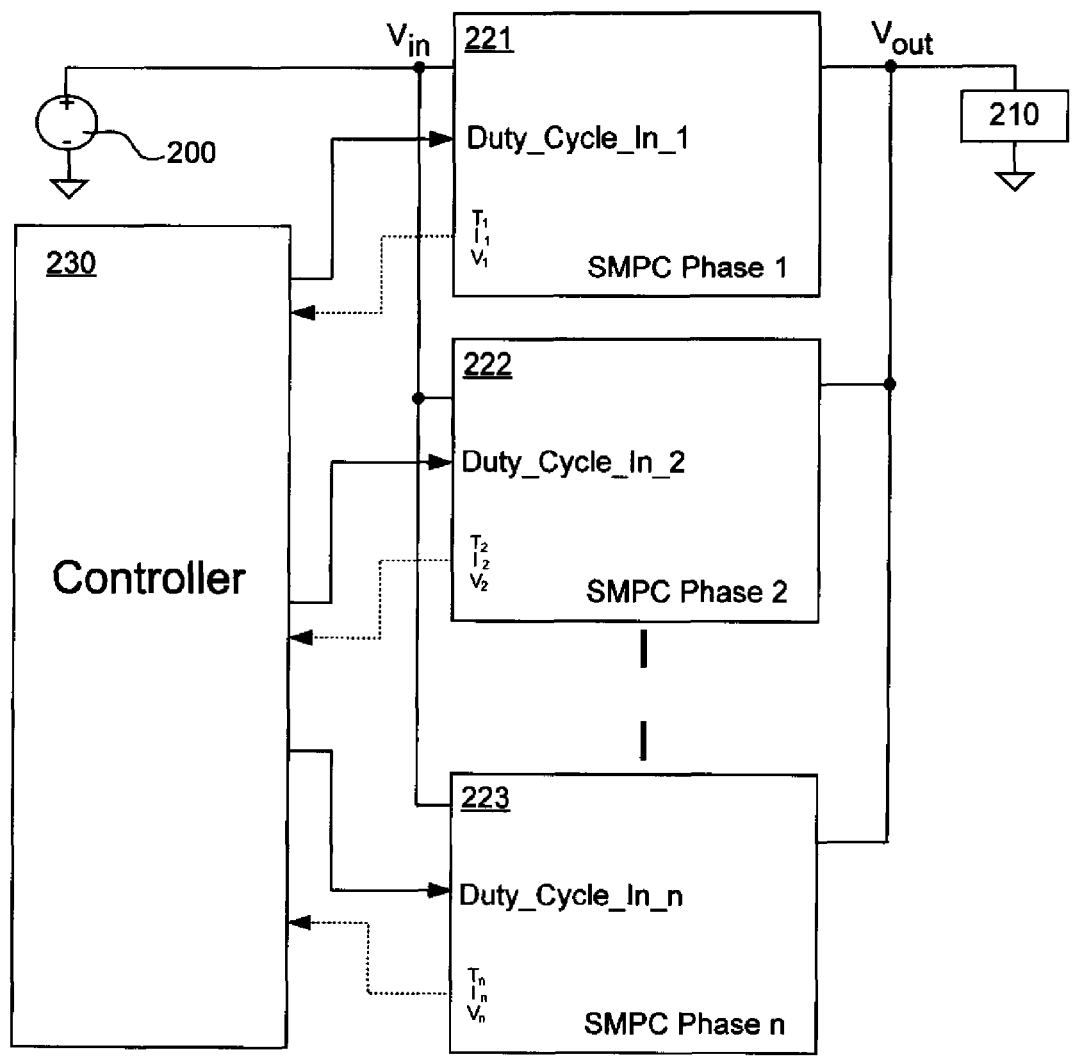
FIG. 2 is a block diagram of an exemplary multi-phase SMPC employing thermal stress and another stress to share power between the phases.

Referring to FIG. 2, the output of a multi-phase DC-DC SMPC supplies a DC voltage to a load 210. As in FIG. 1, the multi-phase SMPC may be a synchronous buck converter utilising n phases fed by a power source 200 (which may be a battery, ac-dc converter, or similar). The n-phase buck converter is controlled by a SMPC controller 230. As per FIG. 1, each phase 221, 222, 223 of the SMPC suitably consists of a pair of switches and an inductor (not shown). Suitably, phase currents are filtered by one or more common output capacitors (not shown). The output voltage Vout is well regulated and predominantly DC, with a small high frequency ripple corresponding to the switching frequency.

As with the arrangement of FIG. 1, regulation of the output voltage is achieved through closed-loop control by the SMPC controller by means of controlling the duty cycle. The SMPC controller senses the output voltage Vout, compares it to a reference value, amplifies and compensates the error signal, and modifies the duty cycle (d). As with the arrangement of FIG. 1, the duty cycle d is fed to the driver of each phase. As with the arrangement of FIG. 1, each of the phases may be shifted with respect to one another, for example the first phase output d1 may be driven without phase shifting ($\phi=0$) with all subsequent phase outputs dk (d2-dn) be driven with a phase delay of $\phi=k*2\pi/n$ relative to the preceding phase output.

As in the arrangement of FIG. 1, the thermal stress of each of the phases 221, 222, 223 is sensed, and reported back to the SMPC controller (signals $T_1$-$T_n$). Additionally, one or both of the current stresses (signals $I_1$-$I_n$) and voltage stresses (signals $V_1$-$V_n$) may be measured and reported back to the controller.

In one arrangement, the SMPC controller dynamically elects one of the thermal stress signals through a multiplexer to become the master thermal stress signal $T_m$. In an alternative embodiment, the SMPC controller averages all thermal stress signals $T_1$-$T_n$, and produces an average for the master thermal stress signal $T_m$. Similarly, a current and or voltage master stress signal may be obtained from the individual stress measurements obtained from the phases.

The controller then employs the temperature stress master signal $T_m$ along with the voltage and or current stress master signals to derive a change value $\Delta d$ separately for each phase in accordance for example with a weighted function for example such as Equation 1. The relationship between a change in duty cycle, and a change in output current per phase is either known, or may be approximated and is set by modification of the individual weightings.

As with the arrangement of FIG. 1, an independent modulator may be employed for each phase to modify the duty cycle by an amount $\Delta d$.

As in the arrangement of FIG. 1, it may be necessary to limit $\Delta d$ that each stress error amplifier may cause in order to improve system behaviour during abnormal situations. In the event of a fault situation, the stress signals Sk of the known faulty phase may be excluded from becoming the master signal for each of temperature, current or voltage as the case may be. In complex systems employing multiple SMPC controllers, stress signals may be distributed to some or all SMPC controllers using suitable analogue or digital buses.

The invention is not limited to the embodiments described but may be varied in construction and detail. For example, the controller may modify the phase outputs in a less dynamic manner, once per start-up for example or after a period when normal operating temperatures have been achieved. Moreover, it will be appreciated generally, that adjustment for different thermal stresses may by virtue of the time constants involved be slower than adjustments for output voltage changes. Also, the controller may rely on expected or modelled thermal stresses rather than sensed temperature. Similarly, whilst the embodiment has been described in terms of an overall arrangement, it will be appreciated that individual phases, controllers and modulators may be provided as individual items, either in discrete or integrated circuit form, for assembly into an overall arrangement and that the scope of protection extends to these individual items and is not limited to the overall arrangement.

The invention claimed is:

1. A method of controlling a multi-phase switch mode power arrangement comprising a plurality of phases configured to deliver DC power to a common load, the method comprising:
   determining the thermal stress of each phase;
   determining at least one other stress of each phase; and
   controlling the share of DC power provided by the individual phases in an effort to equalize the thermal stress and at least one other stress across the individual phases,
   wherein the thermal stress of one phase is dynamically elected as a master thermal stress, and the duty cycles of the individual phases are adjusted by a weighted amount determined by differences between their individual thermal stress and that of the master thermal stress and wherein the at least one other stress of one phase is dynamically elected as the master at least one other stress, and the duty cycles of the individual phases are adjusted by a weighted amount determined by differences between their individual at least one other stress and that of the master at least one other stress.

2. A method of controlling a multi-phase switch mode power arrangement in accordance with claim 1, wherein the at least one other stress comprises a current stress.

3. A method of controlling a multi-phase switch mode power arrangement in accordance with claim 1, wherein the at least one other stress comprises a voltage stress.

4. A method of controlling a multi-phase switch mode power arrangement in accordance with claim 1, wherein the share of DC power provided by the individual phase is determined by a weighted function.

5. A method according to claim 1, wherein the thermal stress of each phase is determined by a co-located temperature sensor.

6. A method according to claim 5, wherein the co-located temperature sensors are positioned to measure the temperature of the switching elements of the phases.

7. A method according to claim 1, wherein a controller controls the share of DC power provided by the individual phases by performing closed-loop control of the phase duty cycles of the individual phases.

8. A switch mode power arrangement for delivering DC power to a load, the arrangement having a plurality of phases sharing the supply of power to the load, wherein the arrangement is configured in response to the determined thermal stress and at least one other stress of each individual phase to adjust the share of power provided by the individual phases in an effort to equalize the thermal stress and at least one other stress across the plurality of phases, and a controller configured to dynamically elect a stress signal from sensed signals of a common type of stress received from the plurality of phases as a master stress signal of that type.

9. A switch mode power arrangement as claimed in claim 8, wherein each phase comprises a controller and a temperature sensor linked with the controller.

10. A switch mode power arrangement as claimed in claim 8, wherein the arrangement is configured to perform closed-loop control of the phase duty cycles.

11. A device, comprising:
a modulator for switching at least one switching device in a phase of a switch mode multi-phase power arrangement for delivering DC power to a load, wherein the modulator is adapted to receive a communicated duty cycle signal, a communicated thermal stress signal and at least one other communicated stress signal, and wherein the modulator is adapted to adjust the received duty cycle in and to provide the adjusted duty cycle to the at least one switching device, wherein the modulator is further adapted to adjust the duty cycle in response to a combination of:
a) a difference between the received thermal stress signal and a sensed thermal stress signal of the phase, and
b) a difference between the received other stress signal and a sensed other stress signal of the phase.

12. A device according to claim 11, wherein the combination is a weighted combination.

13. A device according to claim 11, further comprising:
at least one switching device, a temperature sensor for sensing temperature in the device to provide a sensed temperature and a sensor for sensing the other stress signal.

14. A device according to claim 13, wherein the device is configured to communicate the sensed temperature and sensed other stress signal to a central controller.

* * * * *